(12) United States Patent
Sun et al.

(10) Patent No.: US 11,074,411 B2
(45) Date of Patent: Jul. 27, 2021

(54) DISAMBIGUATION OF CONCEPT CLASSIFICATIONS USING LANGUAGE-SPECIFIC CLUES

(71) Applicant: International Business Machines Corporation, New York, NY (US)

(72) Inventors: Changying Sun, Ottawa (CA); Lin Luo, Ottawa (CA); Graham Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/658,988

(22) Filed: Oct. 21, 2019

(65) Prior Publication Data

US 2021/0117505 A1    Apr. 22, 2021

(51) Int. Cl.
*G06F 40/284*    (2020.01)
*G06F 16/31*    (2019.01)
*G06F 16/332*    (2019.01)
*G06F 40/263*    (2020.01)

(52) U.S. Cl.
CPC .......... *G06F 40/284* (2020.01); *G06F 16/328* (2019.01); *G06F 16/3329* (2019.01); *G06F 40/263* (2020.01)

(58) Field of Classification Search
CPC .. G06F 40/284; G06F 40/263; G06F 16/3329; G06F 16/328
USPC .......................................................... 704/9
See application file for complete search history.

(56) References Cited

U.S. PATENT DOCUMENTS

| | | | |
|---|---|---|---|
| 10,002,126 | B2 | 6/2018 | Grosset et al. |
| 2014/0279677 | A1 | 9/2014 | Grosset et al. |
| 2015/0006160 | A1 | 1/2015 | Grosset et al. |
| 2015/0006432 | A1 | 1/2015 | Grosset et al. |
| 2015/0178270 | A1 | 6/2015 | Zuev et al. |
| 2015/0186776 | A1 | 7/2015 | Petitclerc et al. |
| 2015/0186808 | A1 | 7/2015 | Petitclerc et al. |

OTHER PUBLICATIONS

Guo, "Ontology Clarification by Using Semantic Disambiguation", 12th International Conference on Computer Supported Cooperative Work in Design, Xi'an, China, Apr. 16-18, 2008, 6 pages.

*Primary Examiner* — Thierry L Pham
(74) *Attorney, Agent, or Firm* — Yee & Associates, P.C.

(57) ABSTRACT

A computer-implemented method, system, and computer program product for classifying a concept of a data item. A data item label for the data item is received. The data item label is analyzed using a natural language processing tool to generate additional lexical information for the data item label. A search query is built using the additional lexical information for the data item label. The search query is used to search a clue concept index to produce a search result. The clue concept index comprises clue concept records that identify clues for concepts. The search result identifies clue concept records from the clue concept index that match the search query. A concept is selected from the clue concept records identified in the search result as the concept for the data item.

20 Claims, 7 Drawing Sheets

DISAMBIGUATION OF CONCEPT CLASSIFICATIONS USING LANGUAGE-SPECIFIC CLUES

BACKGROUND

1. Field

The disclosure relates generally to modeling data for business intelligence and other applications. More particularly, illustrative embodiments relate to a computer implemented method, a system, and a computer program product for identifying the concepts of data using language specific clues. More particularly, illustrative embodiments relate to a computer implemented method, a system, and a computer program product for generating a semantic model of data using both semantic concepts in the data and characteristics of the data.

2. Description of the Related Art

Business enterprises and other organizations generate large amounts of data every day. This data may range from fully structured enterprise data sources, such as databases or multidimensional data cubes, to semi-structured sources, such as comma-separated values, CSV, files or electronic spreadsheets. To help improve business performance and drive competitive advantage, users expect that artificial intelligence and analytics systems are able to understand the data, quickly find hidden patterns in the data, discover insights to help them make informed decisions faster, or recommend solutions to help them solve complex problems.

An important building block to achieve these goals and satisfy the needs of enterprise customers is to understand the semantic meaning of their data, discover underlying relationships among these data, and capture the knowledge discovered from the data in a conceptual or semantic model that represents the business interpretation of the data. A semantic model should be able to describe the structure of the data, semantic meanings and data characteristics of each data item, relationships between data items, groups and hierarchies among data items, and more.

Therefore, it would be desirable to have a method and apparatus that take into account at least some of the issues discussed above, as well as other possible issues. For example, it would be desirable to have a method and apparatus that overcome technical problems with classifying the concepts of data using language clues in the data.

SUMMARY

According to illustrative embodiments, a computer-implemented method of classifying a concept of a data item is provided. A data item label is received for the data item. The data item label is analyzed using a natural language processing tool to generate additional lexical information for the data item label. A search query is built using the additional lexical information for the data item label. The search query is used to search a clue concept index to produce a search result. The clue concept index comprises clue concept records that identify clues for concepts. The search result identifies clue concept records from the clue concept index that match the search query. A concept from the clue concept records identified in the search result is selected as the concept for the data item.

According to illustrative embodiments, a system for classifying a concept of a data item is provided. The system comprises a data processing system that is configured to receive a data item label for the data item, analyze the data item label using a natural language processing tool to generate additional lexical information for the data item label, build a search query using the additional lexical information for the data item label, and use the search query to search a clue concept index to produce a search result. The clue concept index comprises clue concept records that identify clues for concepts. The search result identifies clue concept records from the clue concept index that match the search query. The data processing system is configured to select a concept from the clue concept records identified in the search result as the concept for the data item.

According to illustrative embodiments, a computer program product for classifying a concept of a data item is provided. The computer program product comprises a computer readable storage medium having program instructions embodied therewith. The program instructions are executable by a device to cause the device to receive a data item label for the data item, analyze the data item label using a natural language processing tool to generate additional lexical information for the data item label, build a search query using the additional lexical information for the data item label, and use the search query to search a clue concept index to produce a search result. The clue concept index comprises clue concept records that identify clues for concepts. The search result identifies clue concept records from the clue concept index that match the search query. The program instructions are executable by the device to cause the device to select a concept from the clue concept records identified in the search result as the concept for the data item.

Other variations are possible, as described below.

DETAILED DESCRIPTION

The illustrative embodiments recognize and take into account that, traditionally, an artificial intelligence and analytics system may require a data modeler to describe the data manually. Such a manual solution is time consuming and requires intensive training to the data modelers.

In recent years, artificial intelligence and analytics tools and systems have used different approaches to automatically generate semantic models to serve the demands of users.

However, current systems and methods are not able to disambiguate semantic meanings automatically. For example, for data item SALES REP, current approaches could not automatically disambiguate if the field is mostly about REVENUE or about PEOPLE. Lack of accuracy in semantic models that describe the semantic meaning of customer data may result in irrelevant or wrong recommendations and significantly damage credibility and trust that can foster user dissatisfaction or abandonment of analytic systems.

Illustrative embodiments provide a method and apparatus to automatically disambiguate concept classifications using language-specific clues. With this method, an artificial intelligence and analytics system can understand the semantic meaning of customer data better, automatically build a semantic model that describes data with more accurate concepts and discover more accurate relationships, and capture deep knowledge to be used by recommenders.

Illustrative embodiments disambiguate and improve the accuracy of concept classifications via a set of operations, including automatically generating and curating lexical clues, analyzing and enriching clues and data item labels with additional lexical information, including significance for each token, creating unique language-specific concept clue indices, searching clues using a boosted query built with data item label lexical information, and computing a weighted relevance score with a custom scoring algorithm.

Illustrative embodiments provide a system, method, and computer program product for disambiguation in concept classification which solves the ambiguity issues that may be caused by previous methods. Illustrative embodiments also provide a relatively simple and natural way for a user to provide extra language-specific clues to improve concept classification and eliminate unnecessary clues for concept class labels. Illustrative embodiments may be used to build a much more accurate semantic model automatically, without user intervention. Therefore, artificial intelligence and analytics systems and methods that use semantic models that are generated in accordance with illustrative embodiments to accurately describe customer data are better able to automatically recommend solutions to help business users and others to solve complex problems and make informed decisions faster.

Figure 1:
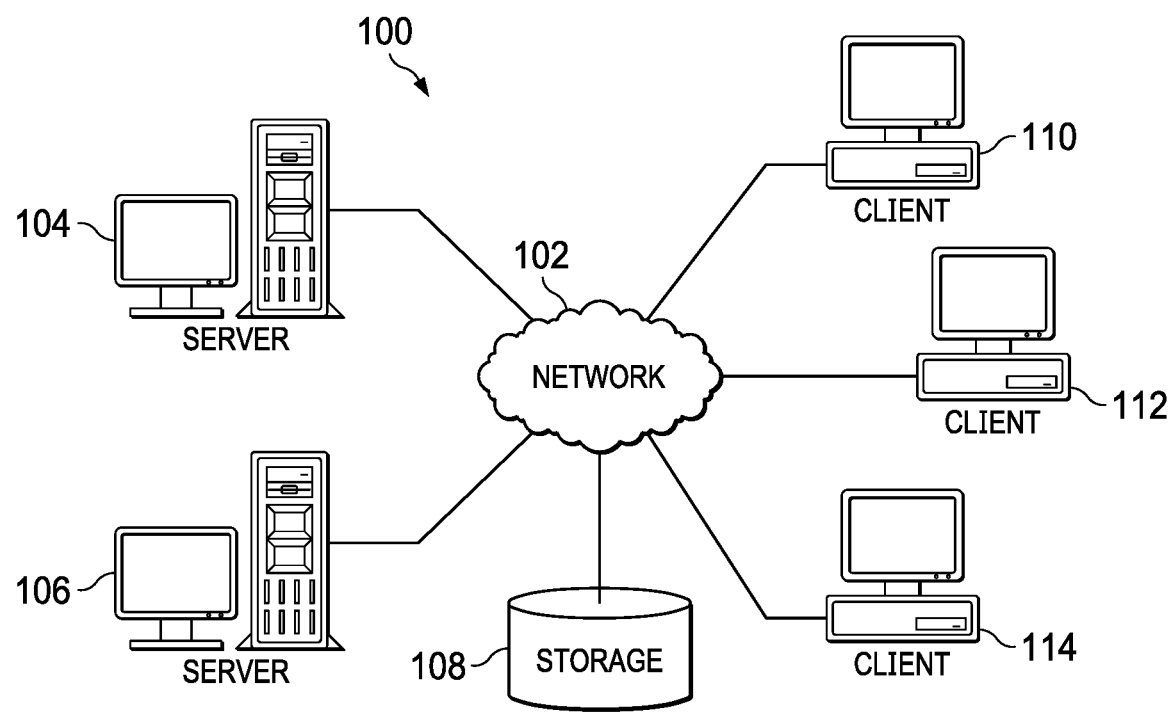
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client devices 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
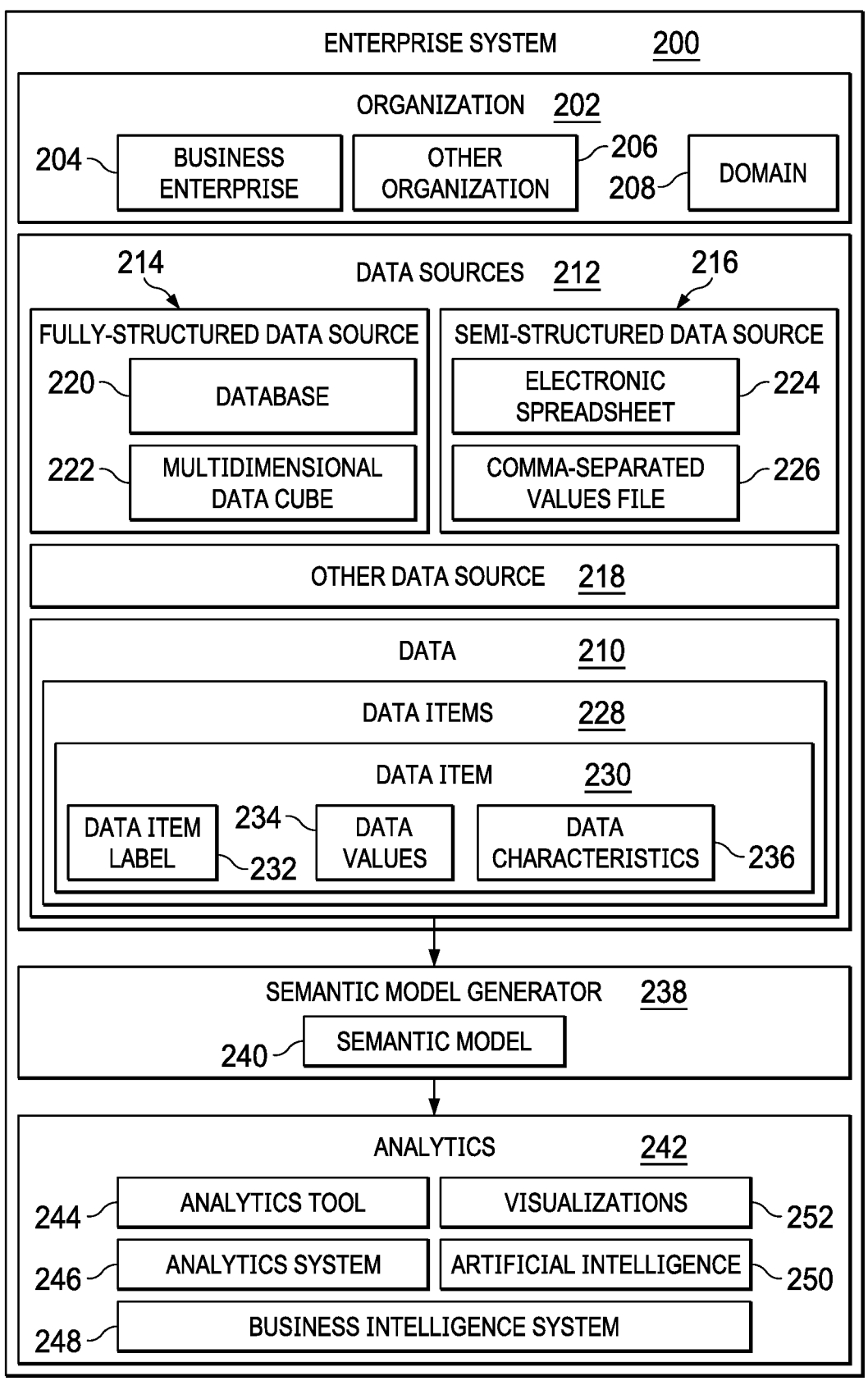
FIG. 2 is a block diagram of an enterprise system including a semantic model generator in accordance with an illustrative embodiment.

With reference to FIG. 2, a block diagram of an enterprise system including a semantic model generator is depicted in accordance with an illustrative embodiment. In this illustrative example, enterprise system 200 includes components that may be implemented in hardware such as the hardware shown in network data processing system 100 in FIG. 1.

Enterprise system 200 may be implemented in software, hardware, firmware or a combination thereof. When software is used, the operations performed by enterprise system 200 may be implemented in program code configured to run on hardware, such as a processor unit. When firmware is used, the operations performed by enterprise system 200 may be implemented in program code and data and stored in persistent memory to run on a processor unit. When hardware is employed, the hardware may include circuits that operate to perform the operations in enterprise system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Enterprise system 200 may be operated by or for any appropriate organization 202. For example, without limitation, organization 202 may be business enterprise 204 or other organization 206. Organization 202 may perform business or other appropriate operations in domain 208.

During operations, and otherwise, enterprise system 200 may generate data 210 from various data sources 212. For example, without limitation, data sources 212 may include fully-structured data source 214, semi-structured data source 216, other data source 218, or any other appropriate combination of data sources. Examples of fully-structured data source 214 may include database 220 and multidimensional data cube 222. Examples of semi-structured data source 216 may include electronic spreadsheet 224 and comma-separated values, CSV, file 226.

Data 212 may comprise a plurality of data items 228. Each data item 230 in plurality of data items 228 may comprise data item label 232 and data values 234. Data item label 232 may comprise alphanumeric text, such as a word, phrase, abbreviation of a word or a phrase, code, or symbol which describes what data values 234 of data item 230 refer to. Data values 234 in data item 230 may have various data characteristics 236. Data characteristics 236 may comprise any appropriate characteristic of data values 234 in data item 230.

Enterprise system 200 may include semantic model generator 238. In accordance with an illustrative embodiment, semantic model generator 238 is configured to automatically generate semantic model 240 of data 210 using a holistic approach by representing the knowledge discovered from data 210 not only with more accurate semantic concepts in domain 208 of data 210 but also with a set of data concepts that represent data characteristics using ontological methods independently from semantic concepts that are tied to a particular domain 208. Alternatively, some or all of the functions performed by semantic model generator 238 may be performed outside of enterprise system 200 with resulting semantic model 240 provided to enterprise system 200 for use by organization 202.

Enterprise system 200 may use semantic model 240 of data 210 to perform analytics 242. Analytics 242 may include the discovery, interpretation, and communication of meaningful patterns in data 210 and the process of applying those patterns towards effective decision making. For example, without limitation, organization 202 may apply analytics to data 210 using semantic model 240 to describe, diagnose, predict, and improve business performance. Semantic model 240 may be used to perform any appropriate analytics 242.

Analytics 242 may be performed using any appropriate analytics tool 244 or analytics system 246. Analytics tool 244 or analytics system 246 may be implemented as part of enterprise system 200. Alternatively, some or all of the functions performed by analytics tool 244 or analytics system 246 may be performed outside of enterprise system 200 with the results of analytics 242 provided to enterprise system 200 for use by organization 202.

For example, without limitation, analytics system 246 may comprise business intelligence system 248. Business intelligence system 248 may be configured to perform analytics 242 using semantic model 240 of data 210 to improve business performance of business enterprise 204 or other organization 206. Analytics tool 244 and analytics system 246 may use artificial intelligence 250 to perform analytics 242. For example, analytics 242 may include generating visualizations 252 of data 210 using semantic model 240 of data 210. Visualizations 252 may include the graphic representation of data 210 including images that communicate relationships among the represented data to viewers of the images.

The illustration of enterprise system 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
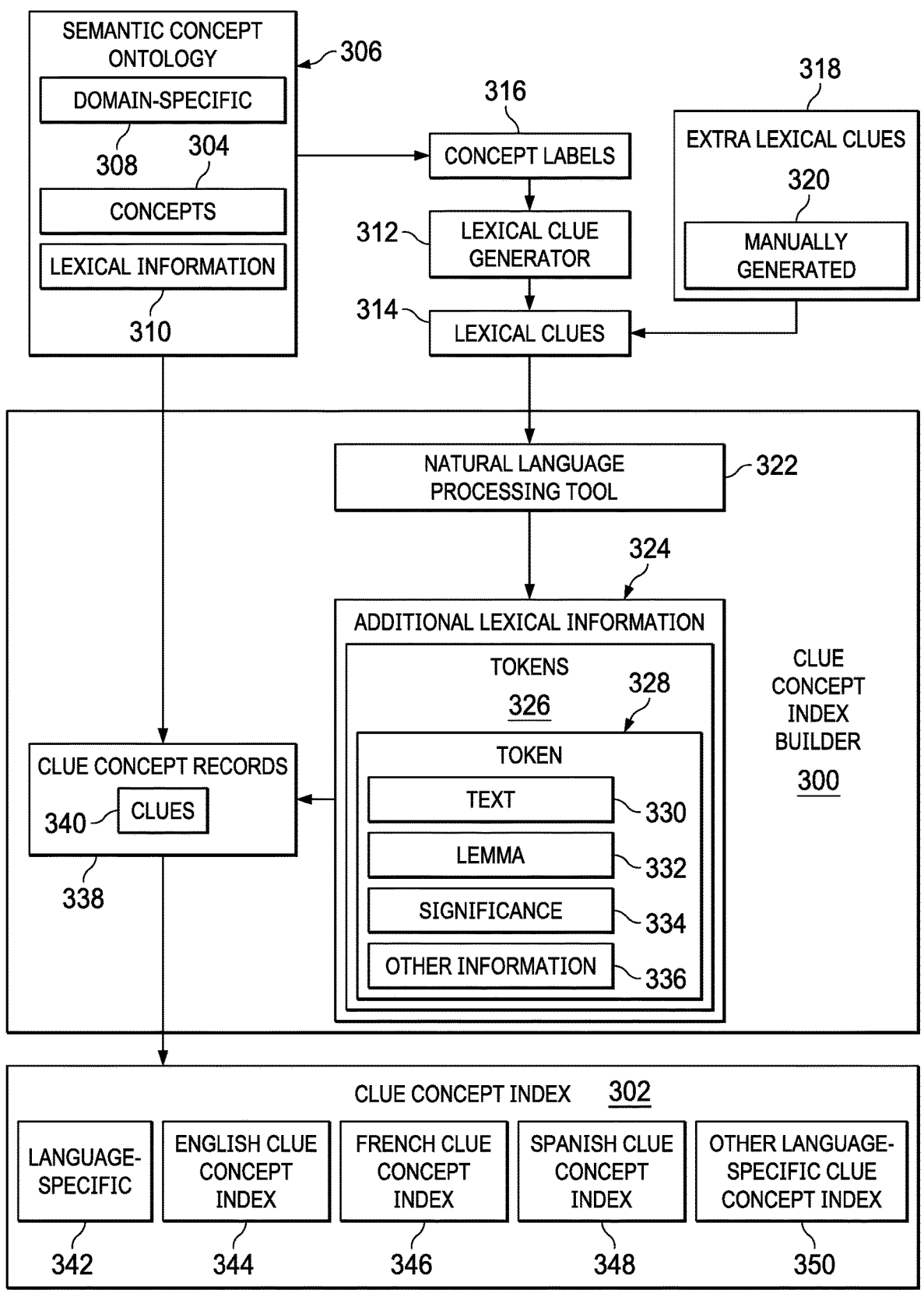
FIG. 3 is a block diagram of a clue concept index builder in accordance with an illustrative embodiment.

Turning to FIG. 3, a block diagram of a clue concept index builder is depicted in accordance with an illustrative embodiment. Clue concept index builder 300 may be implemented in enterprise system 200 in FIG. 2.

Clue concept index builder 300 is configured to generate clue concept index 302 for concepts 304. Concepts 304 may be identified from semantic concept ontology 306. Semantic concept ontology 306 may be domain-specific 308. Lexical information 310 for concepts 304 may be identified in semantic concept ontology 306.

Clue concept index builder 300 may include lexical clue generator 312. Lexical clue generator 312 may be configured to automatically generate lexical clues 314 for concepts 304 from concept labels 316 for concepts 304. Lexical clues 314 for concepts 304 also may include extra lexical clues 318. Extra lexical clues 318 may be manually generated 320.

Clue concept index builder 300 is configured to use natural language processing tool 322 to generate additional lexical information 324 for concepts 304 from lexical clues 314. For example, without limitation, additional lexical information 324 may include tokens 326. Each token 328 in tokens 326 may include text 330, lemma 332 for text 330, an indication of significance 334, and other information 336. For example, text 330 may be a portion of the text from one of lexical clues 314.

For example, lexical clue "weekly hour worked" may be processed using natural language processing tool 322 to generate the following additional lexical information 324:

{
    "text": "weekly hour worked",

```
"tokens": [{
        "text": "weekly",
        "lemma": "weekly",
        "significance": 5,
        "pos": "JJ",
        "positionInPhrase" : 1
    }, {
        "text": "hour",
        "lemma": "hour",
        "significance": 8,
        "pos": "NN",
        "positionInPhrase": 2
    }, {
        "text": "worked",
        "lemma": "work",
        "significance": 5,
        "pos": "VBD",
        "positionInPhrase": 3
    }
    ]
}.
```

Clue concept index builder 300 may be configured to generate clue concept records 338 using each clue information and additional lexical information 324. Clue concept records associate concepts 304 with clues 340 derived from clue information and additional lexical information 324.

An example of a clue concept record generated in accordance with an illustrative embodiment using the additional lexical information 324 for "weekly hour work" presented above is:

```
{
"id": "9841900d|85877537|dffdkda0",
"text": "weekly hour worked",
"textTokenized": "weekly hour worked",
"textLemma": "weekly hour worked work",
"textLexicalInfo": "{\"text\":\"weekly hour worked\", \ "tokens\": [{\"text\":\"weekly\",\"significance\":S,\"pos\":\"JJ\",\"lemma\":\"weekly\",\"positionInPhrase\":;}, {\"text\":\"hour\",\"significance\": ,\"pos\":\"NN\",\"lemma\":\"hour\",\"positionInPhrase\":2;,{\"text\":\"worked\",\"significance\":8,\"pos\":\"VBD\",\"lemma\":\"work\",\"positionInPhrase\":3}]",
"conceptID": "http://www.ibm.com/ontologies/waca/domain/common$Duration",
"ontologyID": "http://www.ibm.com/ontologies/waca/domain/common"
},
```

Clue concept index builder 300 may be configured to incorporate clue concept records 338 into clue concept index 302 to form clue concept index 302.

Clue concept index 302 may be language-specific 342. For example, without limitation, clue concept index 302 may include English clue concept index 344, French clue concept index 346, Spanish clue concept index 348, or other language-specific clue concept index 350.

Figure 4:
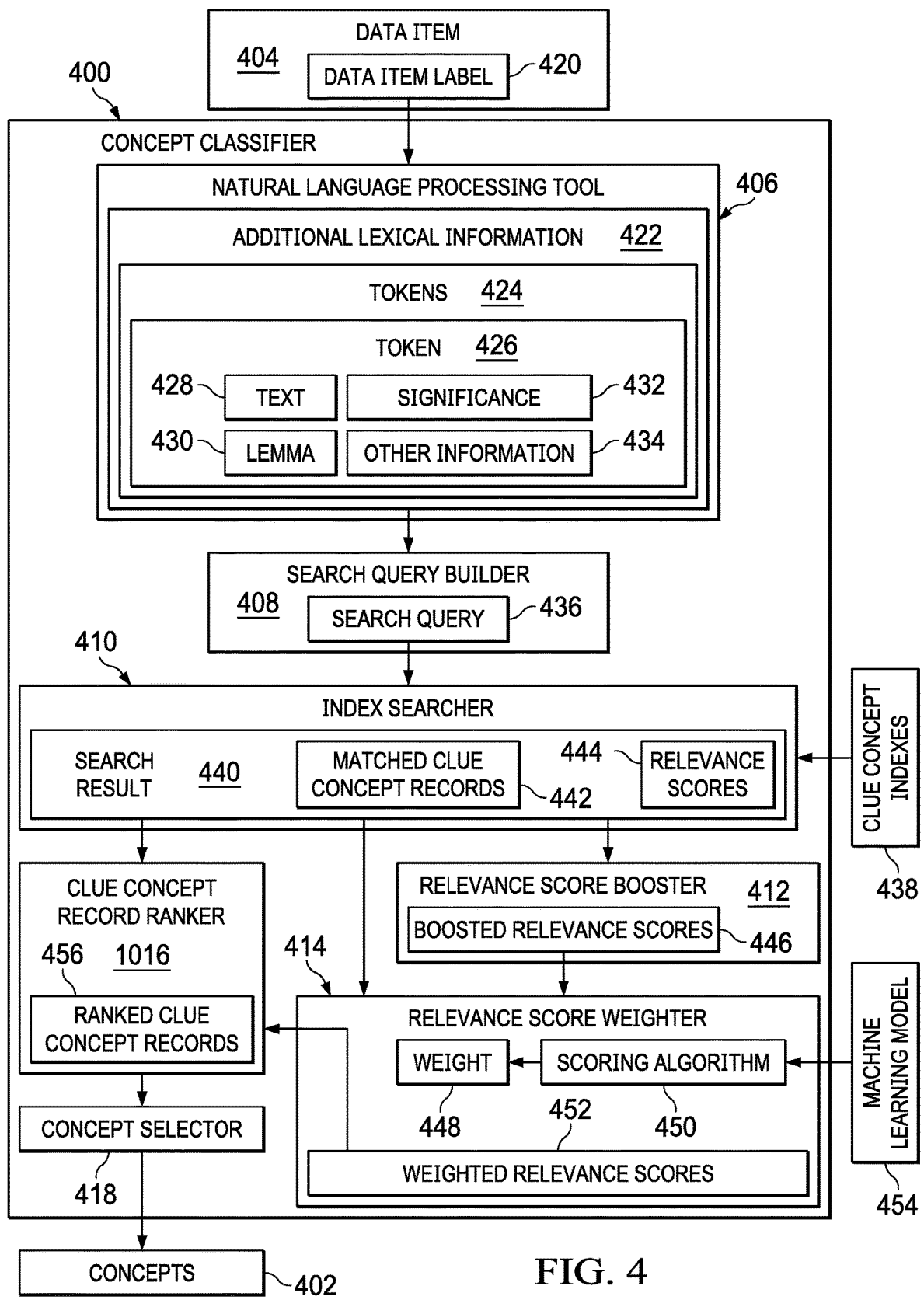
FIG. 4 is a block diagram of a concept classifier in accordance with an illustrative embodiment.

Turning to FIG. 4, a block diagram of a concept classifier is depicted in accordance with an illustrative embodiment. Concept classifier 400 may be implemented in enterprise system 200 in FIG. 2.

Concept classifier 400 is configured to identify concepts 402 for data item 404. Concept classifier 400 may include natural language processing tool 406, search query builder 408, index searcher 410, relevance score booster 412, relevance score weighter 414, clue concept record ranker 416, and concept selector 418.

Concept classifier 400 may be configured to receive data item label 420 for data item 404 to be classified. Natural language processing tool 406 is configured to analyze data item label 420 to generate additional lexical information 422. Additional lexical information 422 may include tokens 424 for data item label 420. Each token 426 in tokens 424 may include text 428, lemma 430 for text 428, an indication of significance 432, or other information 434.

Search query builder 408 is configured to generate search query 436 using additional lexical information 402 for data item label 420. For example, without limitation, search query 436 may use text 428 and lemma 430 from each token 426 of data item label 420.

Index searcher 410 is configured to use search query 436 to search clue concept indexes 438 to obtain search result 440. Clue concept index 302 generated by clue concept index builder 300 in FIG. 3 is an example of clue concept indexes 438 that may be searched using search query 436. For example, without limitation, if the language of data item 404 is determined to be a language other than English, search query 436 may be used to search a language-specific clue concept index for the language of data item 404 and an English clue concept index. If the language of data item 404 is determined to be English, search query 436 may be used to search only an English clue concept index.

Search result 440 may include matched clue concept records 442 and corresponding relevance scores 444 for matched clue concept records 442. For example, matched clue concept records 442 may be clue concept records from clue concept indexes 438 that matched the terms in search query 436. Relevance scores 444 may indicate how well or closely matched clue concept records 442 matched the terms in search query 436.

Relevance score booster 412 is configured to modify relevance scores 444 to generate boosted relevance scores 446. Relevance score booster 412 may be configured to increase or decrease relevance scores 444 based on which fields in matched clue concept records 442 were matched to search query 436 in the search. For example, without limitation, if the original lexical clue text was matched, the relevance score for the corresponding matched clue concept record may be multiplied by 1.5. If the original lexical clue text was not matched, but the text of a token was matched, the relevance score for the corresponding matched clue concept record may be multiplied by 1.2. If the original lexical clue text and the token text were not matched, but the lemma of a token was matched, the relevance score for the corresponding matched clue concept record may not be increased. In this last example, the boosted relevance score for the clue concept record would be the same as the relevance score for the clue concept record.

Relevance score weighter 414 may be configured to apply weights 448 to boosted relevance scores 446 to generate weighted relevance scores 450. For example, without limitation, relevance score weighter 414 may be configured to generate weighted relevance scores 450 by factoring boosted relevance scores 446 with weights 448 calculated by scoring algorithm 452. Relevance score weighter 414 may add weights 448 to each pair of matched items based on their significance and sources, from data item label or from clue, when calculating a ratio of matched items versus total items. Weights 448 calculated by scoring algorithm 452 may be trained by machine learning model 454.

Clue concept record ranker 416 is configured to rank matched clue concept records 442 in search result 440 by weighted relevance scores 450 for matched clue concept records 442 to provide ranked clue concept records 456. Concept selector 418 may be configured to select concepts from the highest ranked clue concept record in ranked clue concept records 456 as concepts 402 for data item 404. In other words, concept selector 418 is configured to select concepts from the clue concept record with the highest weighted relevance score as concepts 402 identified for data item 404.

Figure 5:
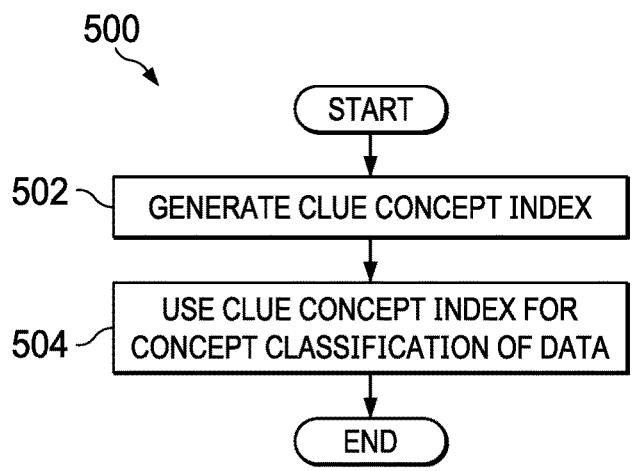
FIG. 5 is an illustration of a flowchart of a process for the concept classification of data in accordance with an illustrative embodiment.

Turning to FIG. 5, an illustration of a flowchart of a process for the concept classification of data is depicted in accordance with an illustrative embodiment. Process 500 may be implemented in enterprise system 200 to identify concepts in data 210 in FIG. 2.

Process 500 may begin with generating a clue concept index (operation 502). The clue concept index may identify various clues for various concepts that may be identified in data. In accordance with an illustrative embodiment, the clues for concepts in the clue concept index may be automatically generated and enhanced using a natural language processing tool. The clue concept index then may be used for the concept classification of data (operation 504), with the process terminating thereafter. For example, the clue concept index may be searched using a search query based on a data item label for a data item to identify concepts for the data item. In accordance with an illustrative embodiment, the search query may include lexical information that is generated by processing the data item label using a natural language processing tool.

Figure 6:
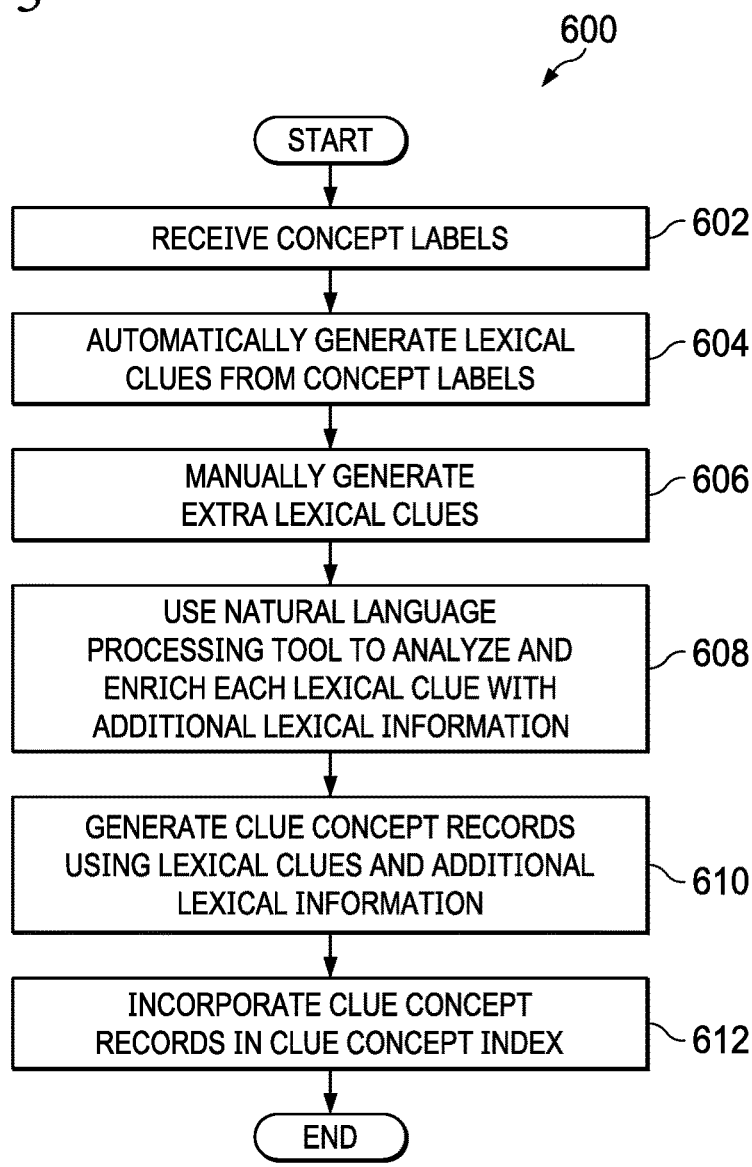
FIG. 6 is an illustration of a flowchart of a process for generating a clue concept index in accordance with an illustrative embodiment

Turning to FIG. 6, an illustration of a flowchart of a process for generating a clue concept index is depicted in accordance with an illustrative embodiment. For example, without limitation, process 600 may be performed by clue concept index builder 300 in FIG. 3. Process 600 may be an example of one implementation of operation 502 in process 500 in FIG. 5.

Process 500 may begin with receiving concept labels for various concepts (operation 502). The concept labels may comprise names, aliases, words, or other information that describes or signifies the concepts. Lexical clues may be automatically generated from the concept labels (operation 504). Lexical clues also may be generated manually by a human operator (operation 506). A natural language processing tool then may be used to analyze and enrich each of the lexical clues with additional lexical information such as tokes, lemma, and an indication of significance for each token (operation 508). Clue concept records then may be created using the lexical clues and corresponding additional lexical information (operation 510). The clue concept records may identify the lexical clues and additional lexical information that are clues for specific concepts. The clue concept records may be incorporated into a clue concept index (operation 512), with the process terminating thereafter.

Figure 7:
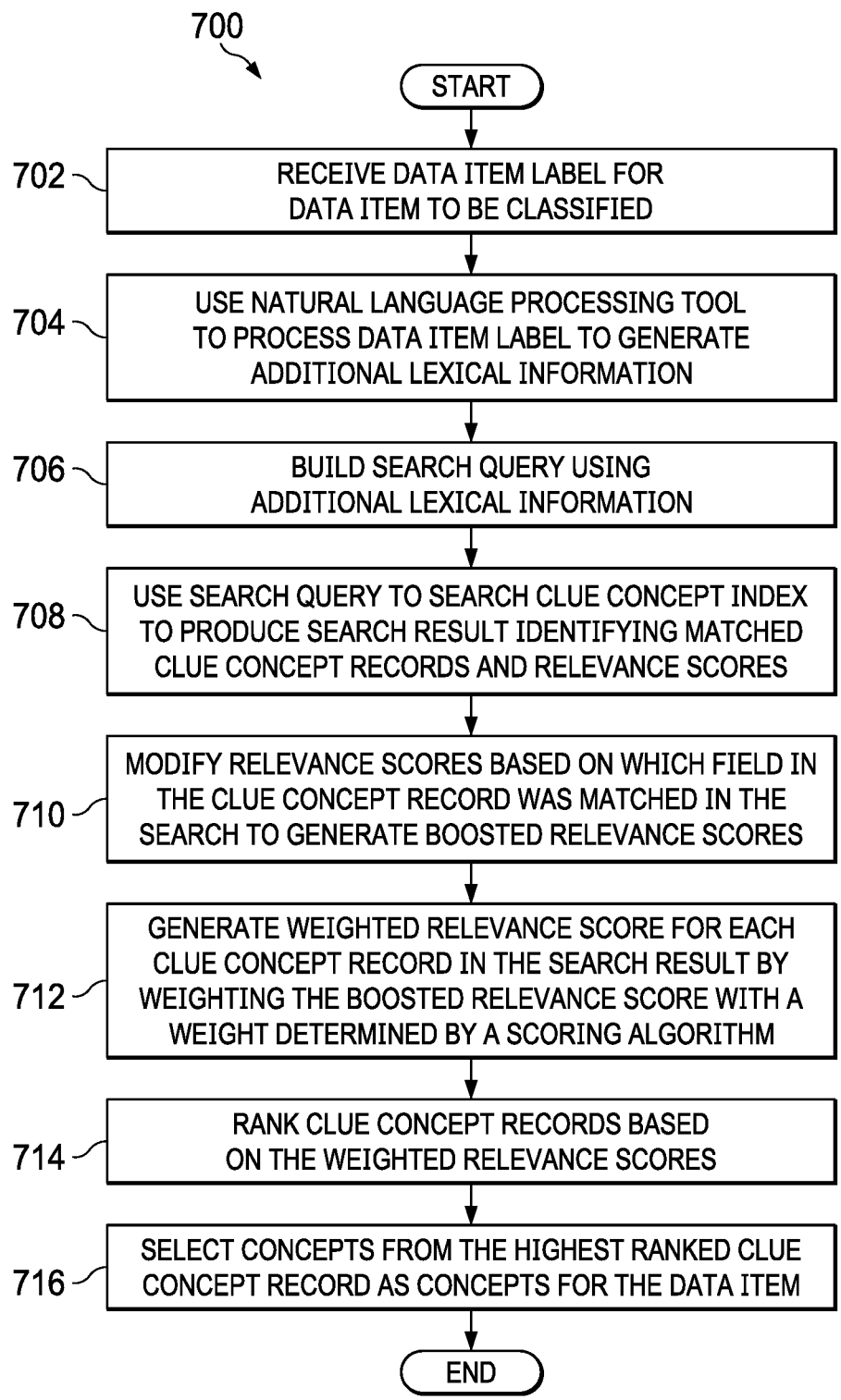
FIG. 7 is an illustration of a flowchart of a process for using a clue concept index for the concept classification of data in accordance with an illustrative embodiment.

Turning to FIG. 7, an illustration of a flowchart of a process for using a clue concept index for the concept classification of data is depicted in accordance with an illustrative embodiment. For example, without limitation, process 700 may be performed by concept classifier 400 in FIG. 4. Process 700 may be an example of one implementation of operation 504 in process 500 in FIG. 5.

Process 700 may begin with receiving a data item label for a data item to be classified (operation 702). A natural language processing tool may be used to process the data item label to generate additional lexical information (operation 704). For example, without limitation, the additional lexical information may include tokens, lemma, and an indication of significance for each token. A search query then may be built using the additional lexical information (operation 706). For example, without limitation, the search query may be built to include the text and lemma from each token of the data item label as search terms. The search query then may be used to search a clue concept index to produce a search result identifying matched clue concept records that match the search query and corresponding relevance scores for the matched clue concept records (operation 708). Each of the relevance scores may indicate, for example, without limitation, how well the search query matched a particular corresponding clue concept record in the search.

The relevance scores may be increased based on which field in the clue concept record was matched in the search to generate boosted relevance scores for the matched clue concept records (operation 710). A weighted relevance score may be generated for each matched clue concept record in the search result by weighting the boosted relevance score for the clue concept record with a weight determined by a scoring algorithm (operation 712). The matched clue concept records from the search result then may be ranked based on the weighted relevance scores for the clue concept records (operation 714). Concepts from the highest ranked clue concept record may be selected as the concepts for the data item (operation 716), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
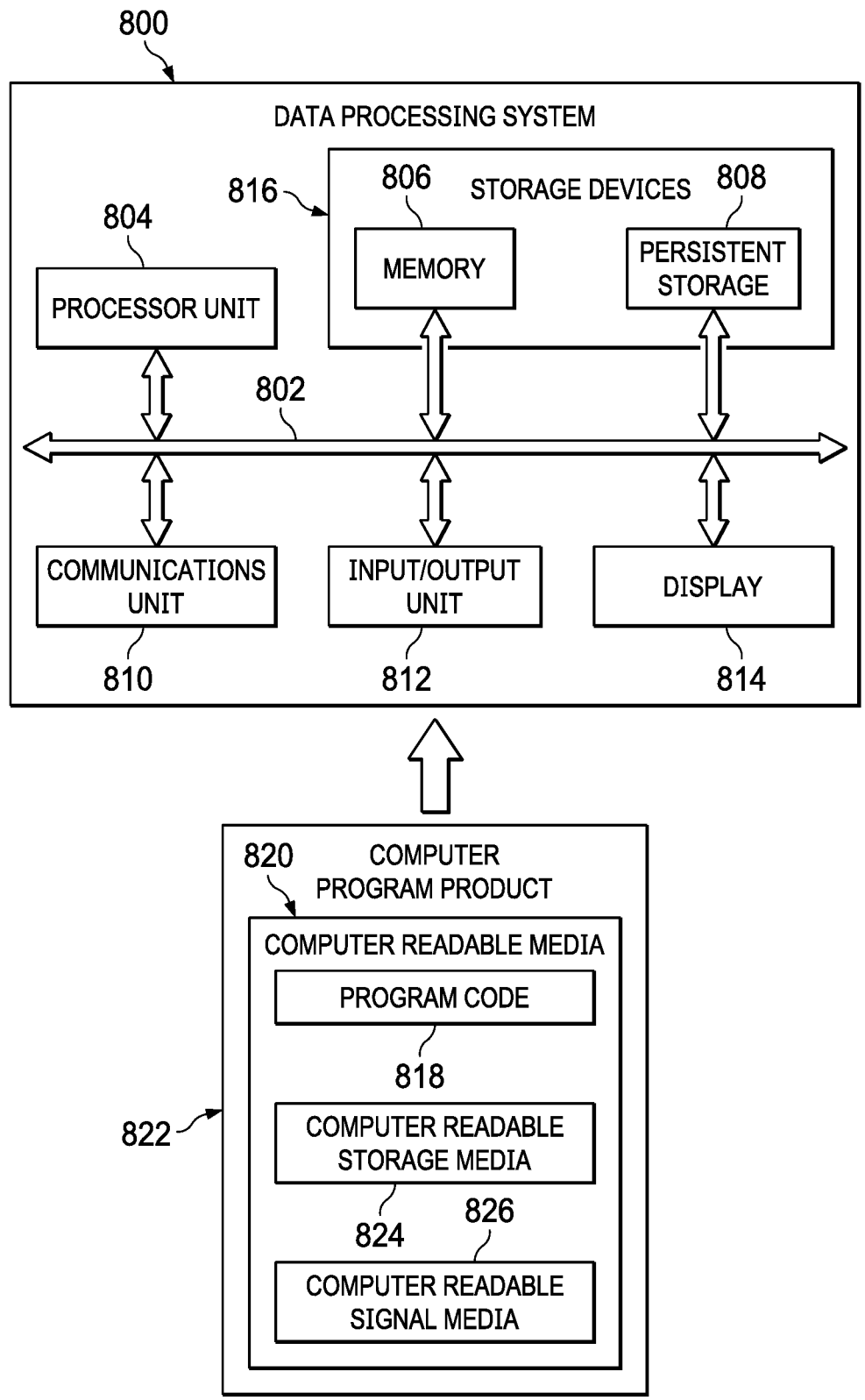
FIG. 8 is a block diagram of a data processing system in accordance with an illustrative embodiment.

Turning to FIG. 8, a block diagram of a data processing system is depicted in accordance with an illustrative embodiment. Data processing system 800 can be used to implement server computer 104, server computer 106, client computer 110, client computer 112, and client computer 114 in FIG. 1. Data processing system 800 can also be used to implement enterprise system 200 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of classifying a concept of a data item, comprising:
   receiving a data item label for the data item;
   analyzing the data item label using a natural language processing tool to generate additional lexical information for the data item label;
   building a search query using the additional lexical information for the data item label;
   using the search query to search a clue concept index to produce a search result, wherein the clue concept index comprises clue concept records that identify clues for concepts, and wherein the search result identifies clue concept records from the clue concept index that match the search query; and
   selecting a concept from the clue concept records identified in the search result as the concept for the data item.

2. The computer-implemented method of claim 1, wherein:
the additional lexical information for the data item label comprises tokens, wherein each token in the tokens comprises text from the data item label and a lemma of the text from the data item label; and
wherein building the search query comprises building the search query using the text and lemma from each token in the tokens for the data item label.

3. The computer-implemented method of claim 1, wherein the search result comprises a relevance score for each clue concept record identified in the search result, and further comprising:
modifying the relevance score for each clue concept record identified in the search result based on which field in the clue concept record is matched to the search query in the search to produce a boosted relevance score for each clue concept record identified in the search result; and
using the boosted relevance score to select a concept from the clue concept records identified in the search result as the concept for the data item.

4. The computer-implemented method of claim 3 further comprising:
determining a weighted relevance score for each clue concept record identified in the search result by weighting the boosted relevance score for each clue concept record identified in the search result with a weight determined by a scoring algorithm; and
selecting concepts in the clue concept record with the highest weighted relevance score as concepts for the data item.

5. The computer-implemented method of claim 4, wherein weights determined by the scoring algorithm are trained by a machine learning model.

6. The computer-implemented method of claim 1, comprising:
identifying a language of the data item label;
determining whether the language of the data item label is English;
in response to a determination that the language of the data item label is not English, using the search query to search a language-specific clue concept index for the language of the data item label and an English clue concept index;
in response to a determination that the language of the data item label is English, using the search query to search only an English clue concept index.

7. The computer implemented method of claim 1 further comprising, generating the clue concept index by:
receiving concept labels for concepts;
automatically generating lexical clues from the concept labels;
analyzing the lexical clues using a natural language processing tool to generate additional lexical information for the concepts;
generating the clue concept records using the lexical clues and additional lexical information as clues for the concepts; and
incorporating the clue concept records in the clue concept index.

8. A system for classifying a concept of a data item, comprising a data processing system configured to:
receive a data item label for the data item;
analyze the data item label using a natural language processing tool to generate additional lexical information for the data item label;
build a search query using the additional lexical information for the data item label;
use the search query to search a clue concept index to produce a search result, wherein the clue concept index comprises clue concept records that identify clues for concepts, and wherein the search result identifies clue concept records from the clue concept index that match the search query; and
select a concept from the clue concept records identified in the search result as the concept for the data item.

9. The system of claim 8, wherein:
the additional lexical information for the data item label comprises tokens, wherein each token in the tokens comprises text from the data item label and a lemma of the text from the data item label; and
wherein the data processing system is configured to build the search query using the text and lemma from each token in the tokens for the data item label.

10. The system of claim 8, wherein the search result comprises a relevance score for each clue concept record identified in the search result, and wherein the data processing system is further configured to:
modify the relevance score for each clue concept record identified in the search result based on which field in the clue concept record is matched to the search query in the search to produce a boosted relevance score for each clue concept record identified in the search result; and
use the boosted relevance score to select the concept from the clue concept records identified in the search result as the concept for the data item.

11. The system of claim 10, wherein the data processing system is further configured to:
determine a weighted relevance score for each clue concept record identified in the search result by weighting the boosted relevance score for each clue concept record identified in the search result with a weight determined by a scoring algorithm; and
select concepts in the clue concept record with the highest weighted relevance score as concepts for the data item.

12. The system of claim 11, wherein weights determined by the scoring algorithm are trained by a machine learning model.

13. The system of claim 8, wherein the data processing system is configured to:
identify a language of the data item label;
determine whether the language of the data item label is English;
in response to a determination that the language of the data item label is not English, use the search query to search a language-specific clue concept index for the language of the data item label and an English clue concept index;
in response to a determination that the language of the data item label is English, use the search query to search only an English clue concept index.

14. The system of claim 8, wherein the data processing system is further configured to generate the clue concept index by:
receiving concept labels for concepts;
automatically generating lexical clues from the concept labels;
analyzing the lexical clues using a natural language processing tool to generate additional lexical information for the concepts;

generating the clue concept records using the lexical clues and additional lexical information as clues for the concepts; and incorporating the clue concept records in the clue concept index.

15. A computer program product for classifying a concept of a data item, the computer program product comprising a computer readable storage medium having program instructions embodied therewith, the program instructions executable by a device to cause the device to:

receive a data item label for the data item;

analyze the data item label using a natural language processing tool to generate additional lexical information for the data item label;

build a search query using the additional lexical information for the data item label;

use the search query to search a clue concept index to produce a search result, wherein the clue concept index comprises clue concept records that identify clues for concepts, and wherein the search result identifies clue concept records from the clue concept index that match the search query; and select a concept from the clue concept records identified in the search result as the concept for the data item.

16. The computer program product of claim 15, wherein:

the additional lexical information for the data item label comprises tokens, wherein each token in the tokens comprises text from the data item label and a lemma of the text from the data item label; and wherein the program instructions are executable by the device to cause the device to build the search query using the text and lemma from each token in the tokens for the data item label.

17. The computer program product of claim 15, wherein the search result comprises a relevance score for each clue concept record identified in the search result, and wherein the program instructions are executable by the device to cause the device to:

modify the relevance score for each clue concept record identified in the search result based on which field in the clue concept record is matched to the search query in the search to produce a boosted relevance score for each clue concept record identified in the search result; and use the boosted relevance score to select the concept from the clue concept records identified in the search result as the concept for the data item.

18. The computer program product of claim 17, wherein the program instructions are executable by the device to cause the device to:

determine a weighted relevance score for each clue concept record identified in the search result by weighting the boosted relevance score for each clue concept record identified in the search result with a weight determined by a scoring algorithm; and select concepts in the clue concept record with the highest weighted relevance score as concepts for the data item.

19. The computer program product of claim 15, wherein the program instructions are executable by the device to cause the device to:

identify a language of the data item label;

determine whether the language of the data item label is English;

in response to a determination that the language of the data item label is not English, use the search query to search a language-specific clue concept index for the language of the data item label and an English clue concept index;

in response to a determination that the language of the data item label is English, use the search query to search only an English clue concept index.

20. The computer program product of claim 15, wherein the program instructions are executable by the device to cause the device to generate the clue concept index by:

receiving concept labels for concepts;

automatically generating lexical clues from the concept labels;

analyzing the lexical clues using a natural language processing tool to generate additional lexical information for the concepts;

generating the clue concept records using the lexical clues and additional lexical information as clues for the concepts; and incorporating the clue concept records in the clue concept index.

* * * * *